US012794038B2

(12) United States Patent
Lahr et al.

(10) Patent No.: US 12,794,038 B2
(45) Date of Patent: Nov. 10, 2026

(54) THERMALLY RESILIENT BATTERY PACK

(71) Applicant: GM GLOBAL TECHNOLOGY OPERATIONS LLC, Detroit, MI (US)

(72) Inventors: Derek Frei Lahr, Ann Arbor, MI (US); SeungHwan Keum, Northville, MI (US); Chinmaya Patil, South Lyon, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 748 days.

(21) Appl. No.: 18/174,266

(22) Filed: Feb. 24, 2023

(65) Prior Publication Data

US 2024/0291063 A1 Aug. 29, 2024

(51) Int. Cl.

| | |
|---|---|
| ***H01M 10/6551*** | (2014.01) |
| ***H01M 10/0525*** | (2010.01) |
| ***H01M 10/658*** | (2014.01) |
| ***H01M 50/204*** | (2021.01) |

(52) U.S. Cl.

CPC ... *H01M 10/6551* (2015.04); *H01M 10/0525* (2013.01); *H01M 10/658* (2015.04); *H01M 50/204* (2021.01)

(58) Field of Classification Search

CPC ........... H01M 10/6551; H01M 10/658; H01M 10/0525; H01M 50/204

USPC ................................................. 429/433, 434

See application file for complete search history.

(56) References Cited

U.S. PATENT DOCUMENTS

| | | | | |
|---|---|---|---|---|
| 2018/0223070 | A1* | 8/2018 | O'Neil et al. | C08J 9/32 |
| 2021/0098759 | A1* | 4/2021 | Herron et al. | H01M 50/276 |

FOREIGN PATENT DOCUMENTS

| | | | | |
|---|---|---|---|---|
| CN | 115053383 A * | 9/2022 | | H01M 50/24 |
| WO | WO 2021150312 A1 * | 7/2021 | | H01M 10/613 |

OTHER PUBLICATIONS

Machine translation of CN 115053383 A (Year: 2022).*

* cited by examiner

*Primary Examiner* — Kevin P Kerns
(74) *Attorney, Agent, or Firm* — CANTOR COLBURN LLP

(57) ABSTRACT

A battery pack having a plurality of battery modules is provided. Each of the plurality of battery modules includes a thermally conductive frame having a plurality of apertures, a plurality of battery cells, wherein each of the plurality of battery cells is disposed in one of the plurality of apertures, and a first potting material disposed in each of the plurality of apertures between each of the plurality of battery cells and the thermally conductive frame.

20 Claims, 13 Drawing Sheets

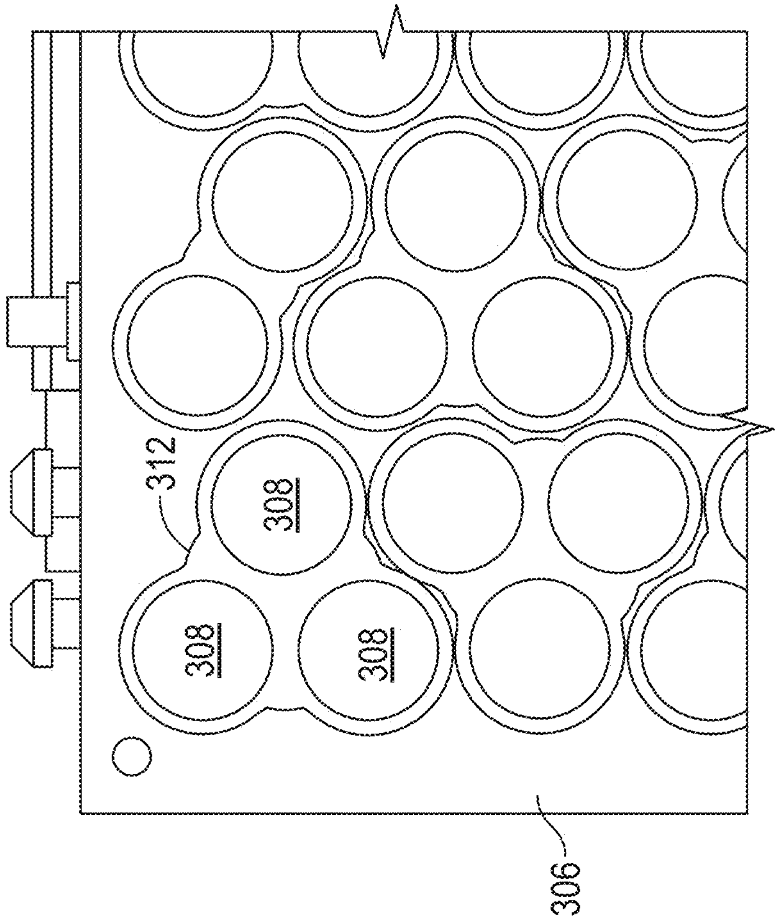
FIG. 3
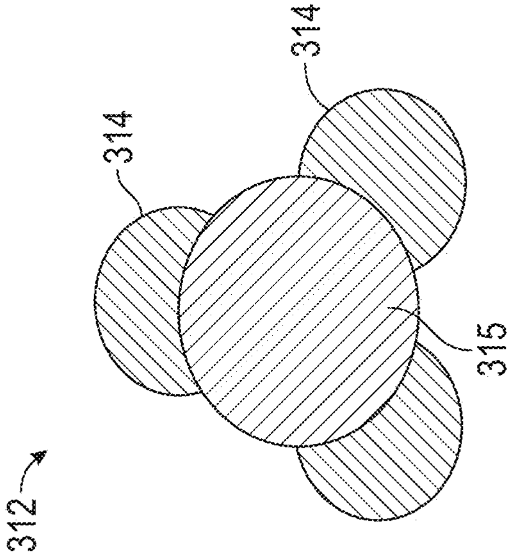

THERMALLY RESILIENT BATTERY PACK

INTRODUCTION

The subject disclosure relates to battery packs. More specifically, the disclosure relates to lithium-ion battery packs having improved thermal resilience.

Lithium-ion batteries are used in a variety of applications, from electric vehicles to residential batteries to grid-scale applications. In general, the term lithium-ion battery refers to a wide array of battery chemistries that each charge and discharge using reactions from a lithiated metal oxide cathode and a graphite anode. Two of the more commonly used lithium-ion chemistries are nickel manganese cobalt (NMC) and lithium iron phosphate (LFP). In general, lithium-ion batteries have better performance when operating between a low temperature (i.e., temperatures above approximately 10 degrees Celsius) and a high temperature (i.e., temperatures below approximately 40 degrees Celsius).

Accordingly, it is desirable to provide a Lithium-ion battery pack that is capable of dissipating heat generated by the Lithium-ion battery cells and which is capable of being heated.

SUMMARY

In one exemplary embodiment, a battery pack having a plurality of battery modules is provided. Each of the plurality of battery modules includes a thermally conductive frame having a plurality of apertures, a plurality of battery cells, wherein each of the plurality of battery cells is disposed in one of the plurality of apertures and a first potting material disposed in each of the plurality of apertures between each of the plurality of battery cells and the thermally conductive frame.

In addition to one or more of the features described herein, the plurality of apertures comprises a first set of apertures that are disposed on an interior portion of the thermally conductive frame and a second set of apertures that are disposed on an exterior portion of the thermally conductive frame and wherein a distance between adjacent apertures of the first set of apertures is less than a distance between apertures of the second set of apertures and an edge of the thermally conductive frame.

In addition to one or more of the features described herein, the distance between apertures of the second set of apertures and an edge of the thermally conductive frame is at least four times greater than the distance between adjacent apertures of the first set of apertures.

In addition to one or more of the features described herein, each of the plurality of battery cells comprises a vented end and a non-vented end and wherein the non-vented end is covered by the first potting material.

In addition to one or more of the features described herein, a second potting material is disposed on the vented end of each of the plurality of battery cells.

In addition to one or more of the features described herein, the vented end of each of the plurality of battery cells includes a fuse that is in contact with a tab portion of a current collector plate and wherein the second potting material is disposed above the tab.

In addition to one or more of the features described herein, the second potting material does not extend above a body portion of the current collector plate.

In addition to one or more of the features described herein, the thermally conductive frame has a thermal mass of at least 850 joule per kilogram per kelvin (J/kgK) and a thermal conductivity of at least 175 Watts per meter-Kelvin (W/mK).

In addition to one or more of the features described herein, each of the plurality of battery modules comprises a first cell holder disposed on a first side of the thermally conductive frame and a second cell holder disposed on a second side of the thermally conductive frame opposite the first side.

In addition to one or more of the features described herein, the first potting material has a thermal conductivity that is lower than a thermal conductivity of the thermally conductive frame.

In another exemplary embodiment, a method for forming a battery module is provided. The method includes inserting each of a plurality of battery cells into one of a plurality of apertures of a thermally conductive frame and affixing a first cell holder to a first side of the thermally conductive frame. The method also includes affixing a second cell holder to a second side of the thermally conductive frame opposite the first side and connecting a first current collector plate to a first electrode disposed on a first end of each of the plurality of battery cells disposed on the first side of the thermally conductive frame. The method further includes connecting a second current collector plate to a second electrode disposed on a second end of each of the plurality of battery cells disposed on the second side of the thermally conductive frame and injecting a first potting material in between each of the plurality of battery cells and the plurality of apertures.

In addition to one or more of the features described herein, the method further includes covering a non-vented end of each of the plurality of battery cells with the first potting material.

In addition to one or more of the features described herein, the method further includes depositing a second potting material above the first tab on a vented end of each of the plurality of battery cells.

In addition to one or more of the features described herein, the second potting material does not extend above a body portion of the first current collector plate or the second current collector plate.

In addition to one or more of the features described herein, the second potting material is deposited in a spiral manner extending from a center of each of the plurality of battery cells to an edge of each of the plurality of battery cells.

In addition to one or more of the features described herein, the second potting material is thixotropic and wherein the second potting material fills an opening above the vented end of each of the plurality of battery cells.

In addition to one or more of the features described herein, the plurality of apertures comprises a first set of apertures that are disposed on an interior portion of the thermally conductive frame and a second set of apertures that are disposed on an exterior portion of the thermally conductive frame and wherein a distance between adjacent apertures of the first set of apertures is less than a distance between apertures of the second set of apertures and an edge of the thermally conductive frame.

In addition to one or more of the features described herein, the distance between apertures of the second set of apertures and an edge of the thermally conductive frame is at least four times greater than the distance between adjacent apertures of the first set of apertures.

In addition to one or more of the features described herein, the first cell holder and the second cell holder each include one or more vents configured to allow air to escape during the injecting.

In addition to one or more of the features described herein, one or more seals are configured to prevent the first potting material from covering a vented end of each of the plurality of battery cells during the injecting.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a schematic diagram illustrating a configuration of apertures in a thermally conductive frame of a battery module for holding battery cells in accordance with an exemplary embodiment;

DETAILED DESCRIPTION

Figure 1A:
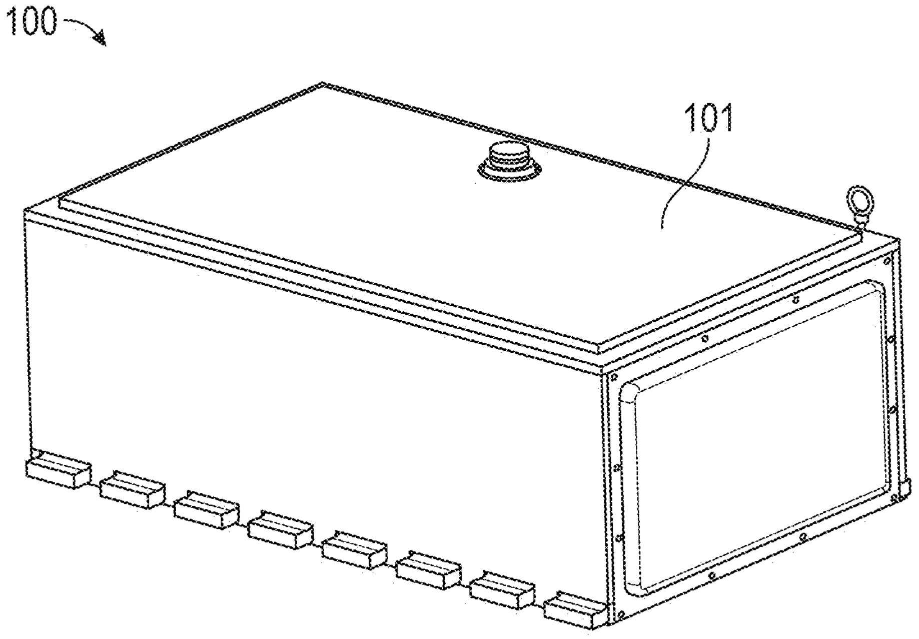
FIGS. 1A and 1B are perspective views of a battery pack in accordance with an exemplary embodiment.

The following description is merely exemplary in nature and is not intended to limit the present disclosure, its application or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include lithium-ion battery packs having improved thermal resilience. The lithium-ion battery packs include a heating element disposed on one side of the battery pack and a cooling plate disposed on the opposing side of the battery pack. The battery packs include a plurality of battery modules that each include a thermally conductive frame that is configured to dissipate heat generated by the battery cells in each battery module. In exemplary embodiments, the battery packs include a first potting material that is disposed between the battery cells and the thermally conductive frame. The first potting material is configured to limit the heat transfer between adjacent battery cells of the battery module to prevent a thermal runaway of one battery cell from affecting adjacent battery cells.

In exemplary embodiments, the battery packs are configured to be used in a vehicle that operates under extreme conditions. In one example, the vehicle is configured to be used in outer space, such as in a lunar rover. In one embodiment, the battery pack is designed with a passive cooling system, (i.e., no cooling fluid is circulated through the battery pack to provide heating and cooling to the battery pack). The battery pack is designed such that a battery module of the battery pack will remain functional after a thermal runaway event by one of the battery cells in the battery module.

Figure 1B:
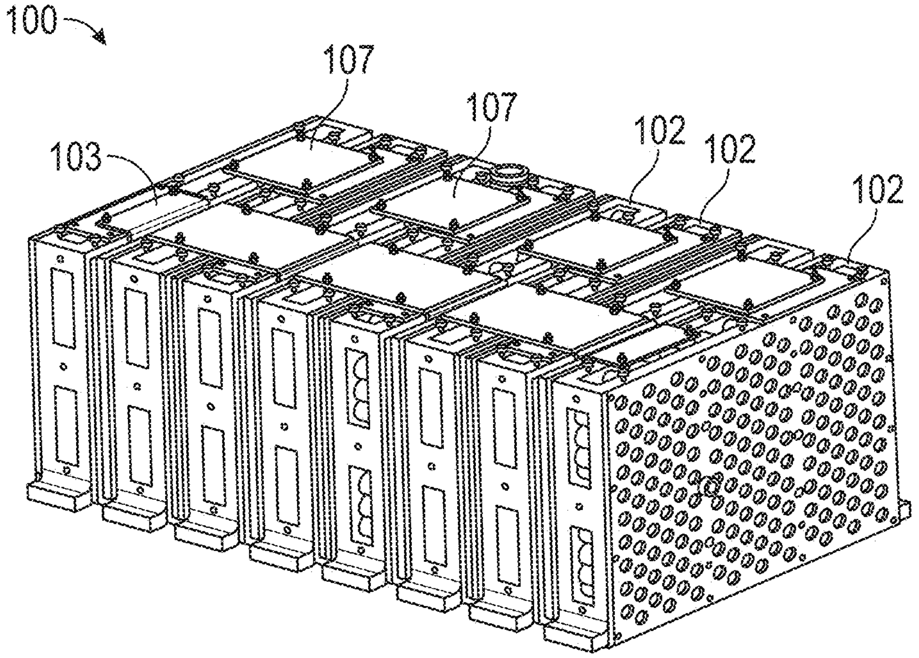

Referring now to FIGS. 1A and 1B perspective views of a battery pack 100 in accordance with an exemplary embodiment are shown. As illustrated, the battery pack 100 includes a cover 101 configured to enclose the battery pack 100. The battery pack 100 also includes a plurality of battery modules 102 that are connected to one another via connecting plates 107. The battery pack 100 also includes one or more heating elements 103 that are disposed on the top surface of the battery module 102 and a cooling plate (not shown) that is disposed on the bottom surface of the battery module 102.

Figure 1C:
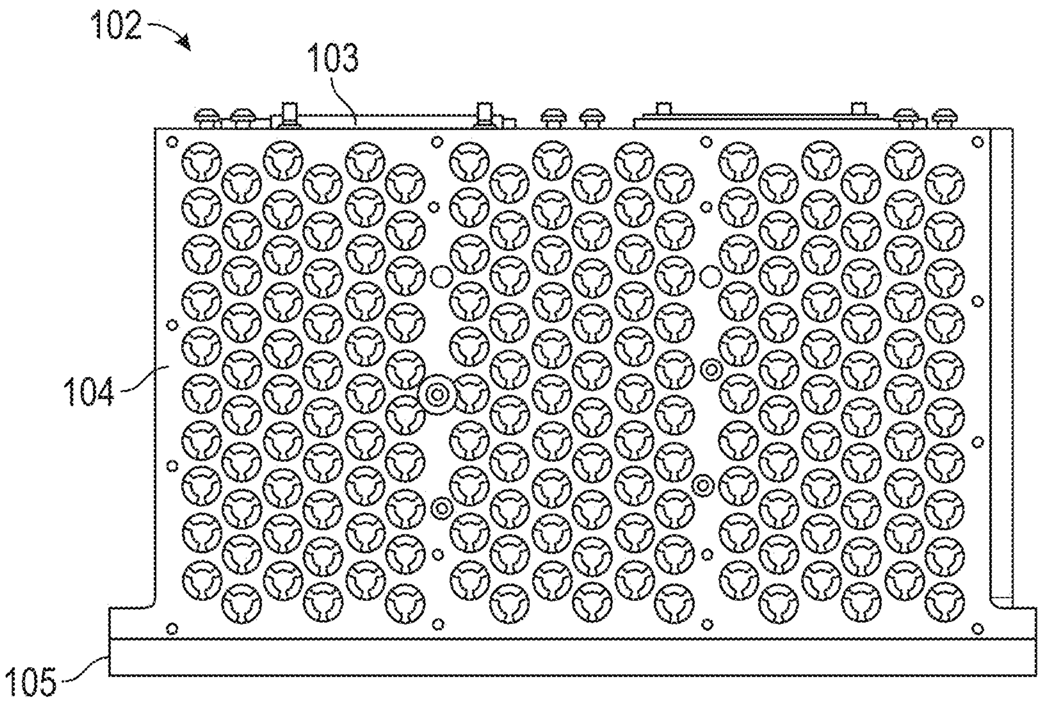
FIG. 1C is a side view of a battery module in accordance with an exemplary embodiment.

FIG. 1C is a side view of a battery module 102 in accordance with an exemplary embodiment. The battery module 102 includes a heating element 103 that is disposed on the top surface of the battery module 102 and a cooling plate 105 that is disposed on the bottom surface of the battery module 102. The battery module 102 also includes a cell holder 104 that is disposed on a first side of the battery module 102. The cell holder 104 is configured to hold one or more battery cells (not shown) in place in the battery module 102. In exemplary embodiments, the battery module 102 includes cell holders 104 disposed on both opposing sides of the battery module 102.

Figure 1D:
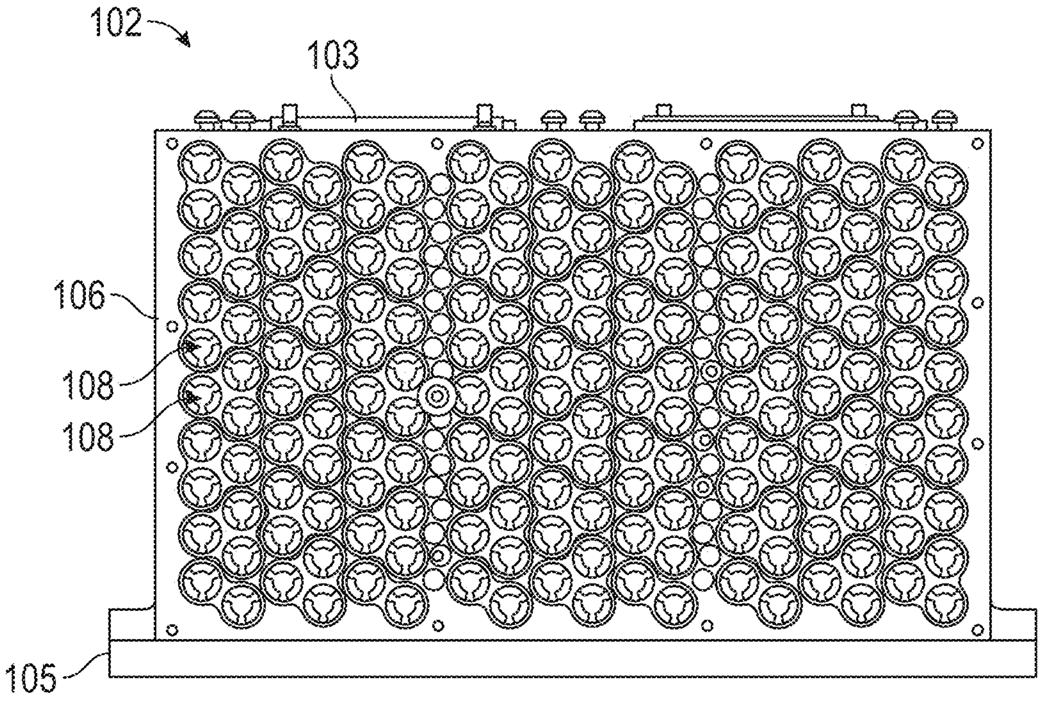
FIG. 1D is a cross-sectional view of a battery module in accordance with an exemplary embodiment.

FIG. 1D is a cross-sectional view of a battery module 102 in accordance with an exemplary embodiment. The battery module 102 includes a heating element 103 that is disposed on the top surface of the battery module 102 and a cooling plate 105 that is disposed on the bottom surface of the battery module 102. The battery module 102 also includes a thermally conductive frame 106 that includes a plurality of apertures that each include a battery cell 108. In exemplary embodiments, the thermally conductive frame 106 has a thermal mass of at least 850 joule per kilogram per kelvin (J/kgK) and a thermal conductivity of at least 175 Watts per meter-Kelvin (W/mK). In one embodiment, the thermally conductive frame 106 has a thermal mass of approximately 900 J/kgK and a thermal conductivity of approximately 200 W/mK. The thermally conductive frame 106 may be constructed of aluminum, an aluminum alloy or another suitable material having the desired thermal properties. In exemplary embodiments, the plurality of apertures of the thermally conductive frame 106 are arranged in a honeycomb pattern.

Figure 2C:
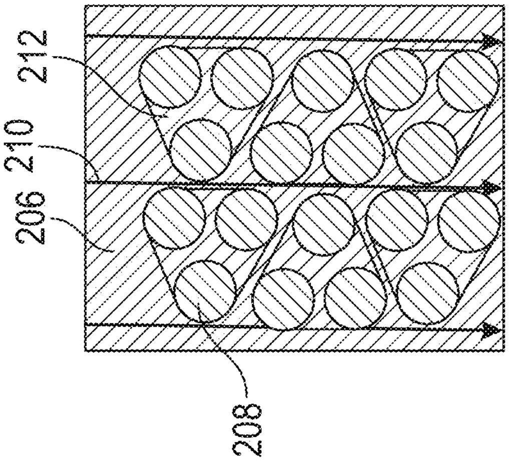
FIGS. 2B and 2C are schematic diagrams illustrating orientations of battery cells in a battery module in accordance with exemplary embodiments.
Figure 2B:
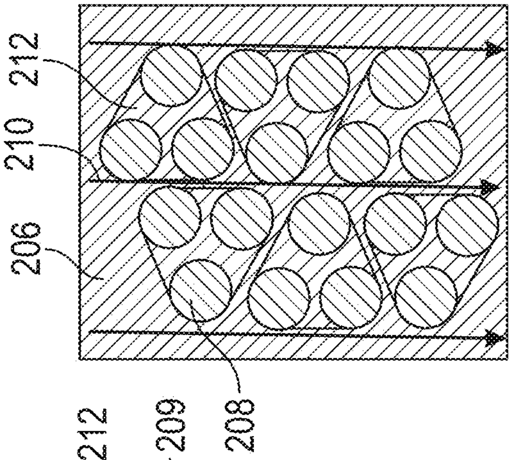
Figure 2A:
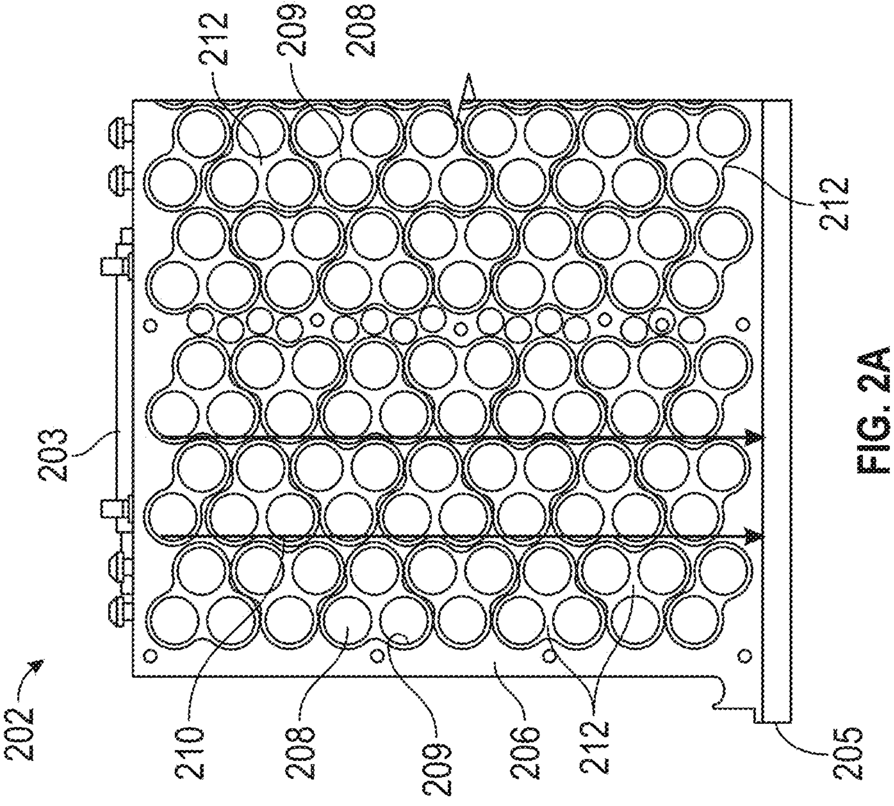
FIG. 2A is a cross-sectional view of a portion of a battery module in accordance with an exemplary embodiment.

Referring now to FIG. 2A a cross-sectional view of a portion of battery module 202 in accordance with an exemplary embodiment is shown. The battery module 202 includes a heating element 203 that is disposed on the top surface of the battery module 202 and a cooling plate 205 that is disposed on the bottom surface of the battery module 202. As illustrated, the battery module 202 includes a thermally conductive frame 206 that includes a plurality of apertures 209 that each include a battery cell 208 disposed therein. In exemplary embodiments, the plurality of apertures 209 are divided into sub-groups 212 that each include three apertures 209 and battery cells 208. In one embodiment, the one or more of the groups can include less than two apertures 209. The sub-groups 212 of apertures 209 are arranged in columns that extend from the top of the top surface of the battery module 202 to the bottom surface of the battery module 202. In exemplary embodiments, a cooling ribbon 210 is disposed between each column of sub-groups 212 of apertures 209. The cooling ribbon 210 is a solid piece of thermally conductive material that extends from the top of the top surface of the battery module 202 to the bottom surface of the battery module 202 and provides a path to dissipate heat generated by the battery cells 208. In exemplary embodiments, the cooling ribbon 210 is a continuous portion of the thermally conductive frame 206 that extends from the heating element 203 to the cooling plate 205.

In exemplary embodiments, each of the plurality of apertures 209 are configured to receive a battery cell 208. In one embodiment, each of the plurality of apertures 209 is cylindrical in shape and has a diameter that is approximately one to two millimeters larger than the diameter of the battery cells 208. As a result, when a battery cell 208 is inserted into an aperture 209, there is a circumferential space of approximately one-half to one millimeter between the battery cell 208 and a sidewall of the aperture 209.

Referring now to FIGS. 2B and 2C schematic diagrams illustrating the configuration of battery cells in a battery module in accordance with exemplary embodiments are shown. As illustrated, the thermally conductive frame 206 of a battery module includes a plurality of battery cells 208 that are grouped into sub-groups 212. In one embodiment, each sub-group 212 includes three battery cells 208 that are configured in a triangular configuration. In exemplary embodiments, the sub-groups 212 are arranged into columns and a cooling ribbon 210 is disposed between each column. In one embodiment, as best shown in FIG. 2B, adjacent columns of sub-groups 212 include sub-groups 212 that have a different orientation from each other. In another embodiment, as best shown in FIG. 2C, adjacent columns of sub-groups 212 include sub-groups 212 that have the same orientation as each other. In exemplary embodiments, providing adjacent columns of sub-groups 212 including sub-groups 212 that have a different orientation from each other increases the rigidity of the thermally conductive frame 206. In exemplary embodiments, the orientation of the sub-groups 212 is configured to both minimize a length of a path from the battery cells 208 to the cooling plate 205 and to maximize a structural strength of the thermally conductive frame 206.

Referring now to FIG. 3 a schematic diagram illustrating a configuration of a sub-group 312 of apertures in a thermally conductive frame 306 of a battery module in accordance with an exemplary embodiment is shown. In exemplary embodiments, the sub-group 312 of apertures includes three apertures 314 that are each configured to receive a battery cell 308. In one embodiment, the three apertures 314 are disposed in a triangular pattern. The sub-group 312 of apertures also includes a central aperture 315 that is disposed between the three apertures 314. In one embodiment, the central aperture 315 at least partially overlaps each of the three apertures 314. In one embodiment, the central aperture 315 is disposed in the center of a triangle formed by the three apertures 314. In exemplary embodiments, the sub-group 312 of apertures is formed by forming each of the three apertures 314 and then forming the central aperture 315. In an exemplary embodiment, a space in the sub-group 312 of apertures is filled with a potting material after battery cells 308 are inserted into the three apertures 314. In exemplary embodiments, approximately sixty percent (60%) of the surface area of each of three apertures 314 is exposed to the thermally conductive frame 306, which increases the heat transfer between battery cells 308 disposed in the apertures 314 with the frame 306. In exemplary embodiments, each of the battery cells 308 has the same amount of surface area of that is exposed to the thermally conductive frame 306.

Figure 4B:
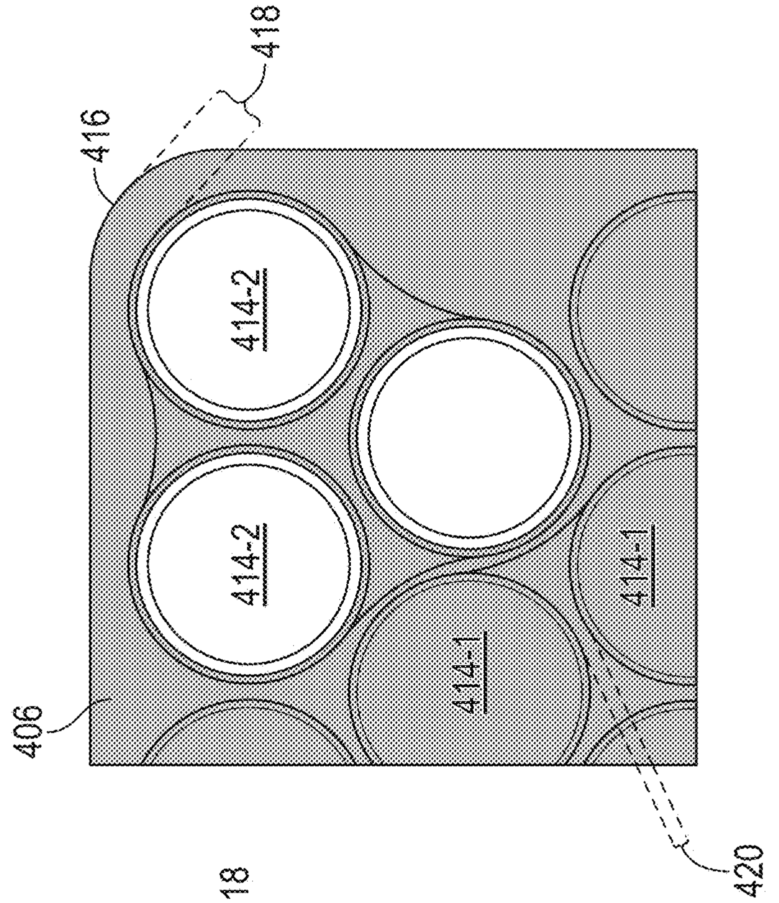
FIGS. 4A and 4B are schematic diagrams of a portion of a thermally conductive frame of a battery module in accordance with exemplary embodiments.
Figure 4A:
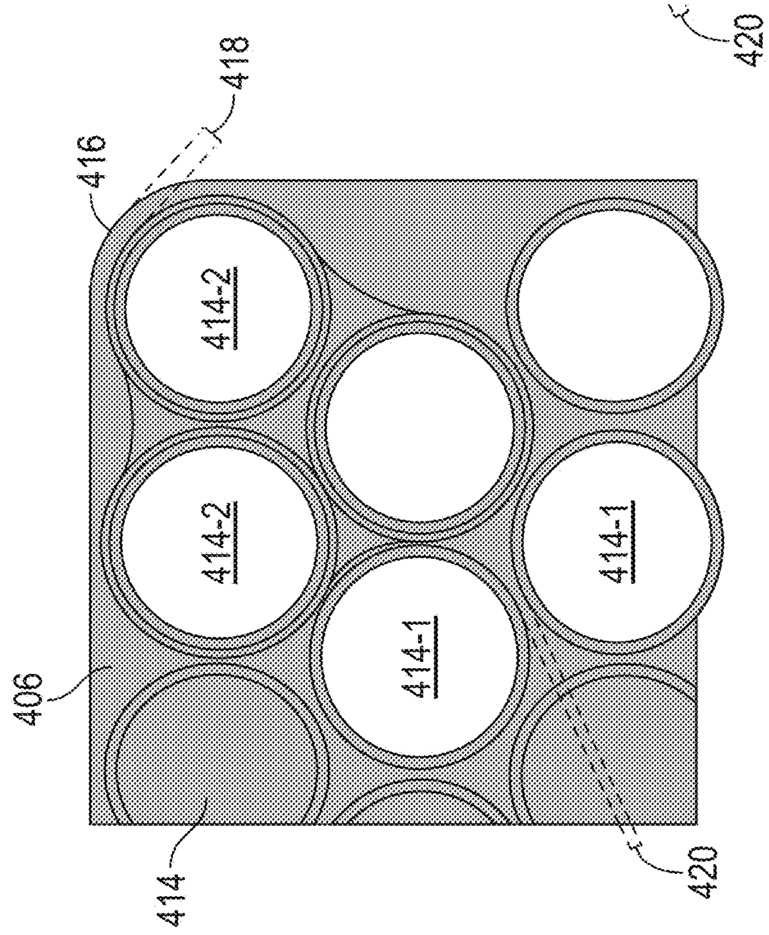

Referring now to FIGS. 4A and 4B schematic diagrams of a portion of a thermally conductive frame 406 of a battery module in accordance with exemplary embodiments are shown. As illustrated, the thermally conductive frame 406 includes a plurality of apertures 414 that are each configured to receive a battery cell (not shown). In exemplary embodiments, the thermally conductive frame 406 has a thermal mass of at least 850 J/kgK and a thermal conductivity of at least 175 W/mK. The thermally conductive frame 406 may be constructed of aluminum, an aluminum alloy or another suitable material having the desired thermal properties. In exemplary embodiments, the apertures 414 may be characterized as being one of an interior aperture 414-1 and an exterior aperture 414-2. As used herein, an interior aperture 414-1 is an aperture that has another aperture disposed between it and an edge 416 of the thermally conductive frame 406 and an exterior aperture 414-2 is an aperture that has another aperture disposed between it and the edge 416 of the thermally conductive frame 406.

In one embodiment, as best shown in FIG. 4A, a distance 420 between two adjacent interior apertures 414-1 is the same as a distance 418 between an exterior aperture 414-2 and the edge 416 of the thermally conductive frame 406. In one embodiment, as best shown in FIG. 4B, a distance 420 between two adjacent interior apertures 414-1 is less than the distance 418 between an exterior aperture 414-2 and the edge 416 of the thermally conductive frame 406. In exemplary embodiments, the distance 418 is at least four times greater than the distance 420. In exemplary embodiments, providing a larger distance 418 between an exterior aperture 414-2 and the edge 416 of the thermally conductive frame 406 results in a larger amount of thermally conductive material to dissipate heat generated by a battery cell disposed in an exterior aperture 414-2. In exemplary embodiments, the interior apertures 414-1 and the exterior apertures 414-2 are uniformly spaced with respect to one another.

Figure 5:
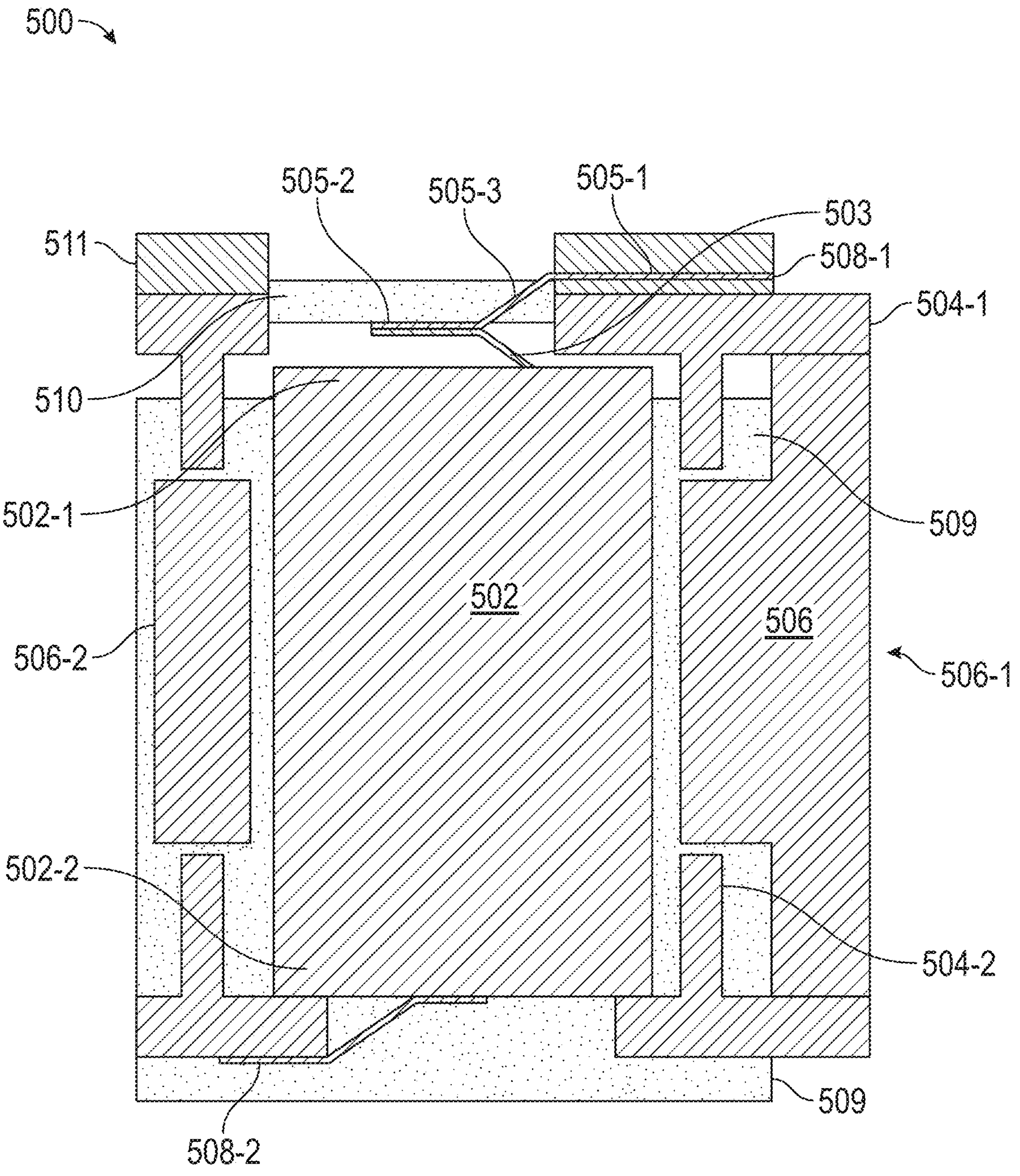
FIG. 5 is a cross-sectional view of a portion of a battery module including a battery cell in accordance with an exemplary embodiment.

Referring now to FIG. 5, a cross-sectional view of a portion of a battery module 500 including a battery cell 502 in accordance with an exemplary embodiment is shown. As illustrated, the battery cell 502 includes a first end 502-1, also referred to herein as a vented end 502-1, and a second end 502-2, also referred to herein as a non-vented end 502-2. The battery cell 502 also includes an electrode 503 disposed on a vented end 502-1. The battery module 500 includes a first cell holder 504-1 that is disposed adjacent to the first end 502-1 of the battery cell 502 and a second cell holder 504-2 that is disposed adjacent to the second end 502-2 of the battery cell 502. The battery module 500 also includes a thermally conductive frame 506 that is disposed on either side of the battery cell 502. As illustrated, the thermally conductive frame 506 may include an interior portion 506-1 that is disposed between the battery cell 502 and an adjacent battery cell 502 and an exterior portion 506-2 that is disposed between the battery cell 502 and an edge of the thermally conductive frame 506.

In an exemplary embodiment, the battery module 500 includes a first potting material 509 that is disposed between the battery cell and the thermally conductive frame 506. In one embodiment, the first potting material 509 is also disposed between the battery cell 502 and the first cell holder 504-1 and the second cell holder 504-2. In one embodiment, the first potting material 509 is one of an epoxy, polyurethane, silicone, polyamide, bismaleimide, benzoxizine, or polyester. The first potting material is configured to thermally insulate the battery cells 502 from heat generated by adjacent battery cells and to prevent a thermal runaway event in an adjacent battery cell from damaging the battery cell 502. The first potting material 509 is further configured to conduct heat from a normally operating battery cell 502 to the ribbon.

In an exemplary embodiment, the battery module 500 includes a first current collector plate 508-1 that is configured to electrically connect to an electrode 503 disposed on a vented end 502-1 of the battery cell 502. The battery module 500 also includes a second current collector plate 508-2 that is configured to electrically connect to the non-vented end 502-2 of the battery cell 502. In exemplary embodiments, the non-vented end 502-2 of the battery cell 502 is covered by the first potting material 509 and the first potting material 509 encapsulates at least a portion of the second current collector plate 508-2.

In exemplary embodiments, the battery module 500 also includes a second potting material 510 that is disposed above a vented end 502-1 of the battery cell 502. The second potting material 510 is one of an epoxy, polyurethane, silicone, polyamide, bismaleimide, benzoxizine, or polyester. In exemplary embodiments, the second potting material 510 is disposed above an upper portion of the electrode 503 and on top of a tab portion 505-2 of the first current collector plate 508-1. The second potting material 510 encapsulates a fuse 505-3 that connects the tab portion 505-2 and the body portion 505-1 of the first current collector plate 508-1. The second potting material 510 does not extend above a body portion 505-1 of the first current collector plate 508-1. As a result, the second potting material 510 does not obstruct a vent of the battery cell 502. In exemplary embodiments, the second potting material 510 is configured to adhere to the tab portion 505-2 of the first current collector plate 508-1. It is also adhered to 504-1, but in a manner such that it does provide significant resistance to the vent opening because too high of a bond will prevent the cell from venting properly and too weak of a bond and the potting will not be secure to shock and vibration. In exemplary embodiments, the second potting material 510 is configured to separate from the tab portion 505-2 of the first current collector plate 508-1 based on an increase in pressure between the second potting material 510 and the battery cell 502, this increase in pressure may be caused by gasses emitted by a vent of the battery cell 502. In exemplary embodiments, the battery module 500 also includes a third potting material 511 that is disposed on the first cell holder 504-1 and that is configured to at least partially encapsulate a body portion 505-1 of the first current collector plate 508-1.

Figure 6:
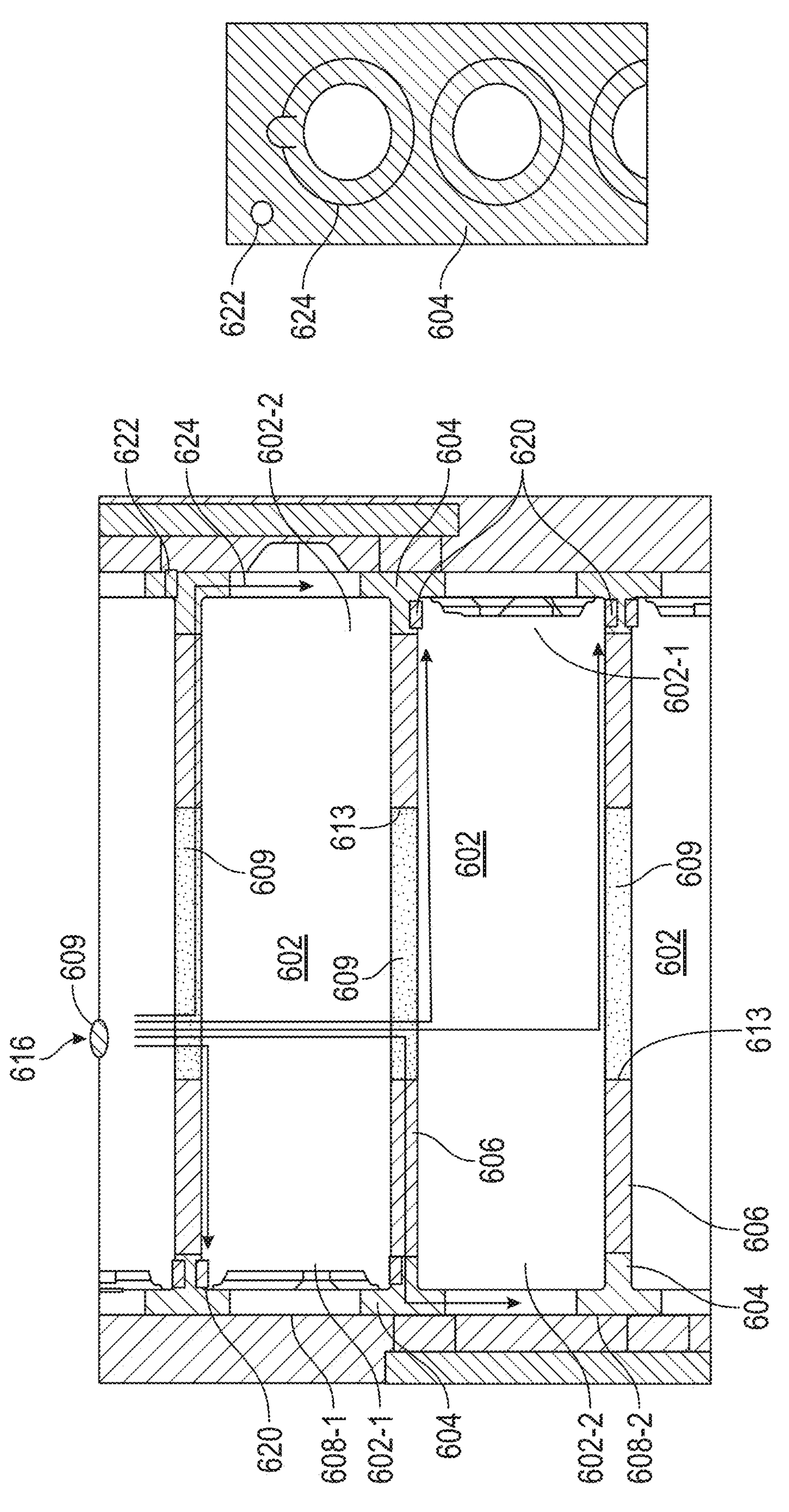
FIG. 6 is a cross-sectional view of a portion of a battery module illustrating the injection of a potting material into the battery module in accordance with an exemplary embodiment.

Referring now to FIG. 6 a cross-sectional view of a portion of a battery module illustrating the injection of a potting material into the battery module in accordance with an exemplary embodiment is shown. As illustrated the battery module includes a plurality of battery cells 602 that each include a vented end 602-1 and a non-vented end 602-2. In one embodiment, the battery module 600 also includes a first current collector plate 608-1 and a second current collector plate 608-2 that are respectively connected to the vented end 602-1 and the non-vented end 602-2 of the of battery cells 602. The battery cells 602 are disposed between cell holders 604 that are disposed on opposing ends of the battery cell 602. In addition, a portion of the thermally conductive frame 606 is disposed between each of the battery cells 602. In exemplary embodiments, an opening 613 is disposed between the portions of the thermally conductive frame 606 located between each of the battery cells 602.

In exemplary embodiments, the battery module includes an aperture 616 disposed on an exterior portion of the battery module. The aperture 616 is configured to receive a first potting material 609 which is injected into the battery module. In exemplary embodiments, the first potting material 609 fills the space between the battery cells 602 and the thermally conductive frame 606 by flowing through the openings 613. The first potting material 609 also covers the non-vented end 602-2 of the battery cells 602. In exemplary embodiments, a plurality of stops 620 are disposed adjacent to the vented ends 602-1 of the battery cells 602 that prevent the first potting material 609 from covering the vented ends 602-1 of the battery cells 602. In exemplary embodiments, one or more of the cell holders 604 include channels 624 that are configured to direct and control the flow of the first potting material around the non-vented end 602-2 of the battery cells 602. In addition, the cell holders 604 may include a vent hole 622 that is configured to allow air to escape from the battery module while the first potting material 609 is being injected into the battery module.

Figure 7A:
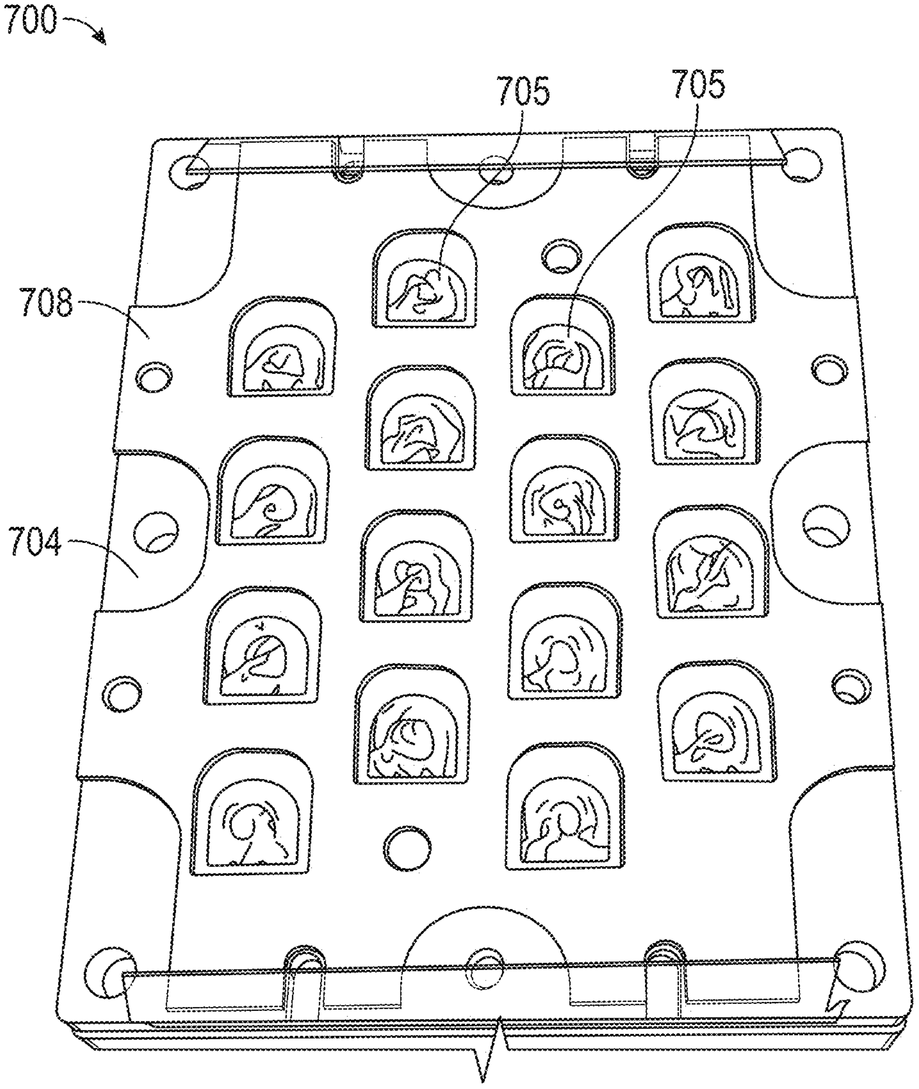
FIG. 7A is a perspective view of a battery module illustrating a potting material disposed on a vented end of the battery cells in accordance with an exemplary embodiment.

Referring now to FIG. 7A, a perspective view of the top of a battery module 700 illustrating a potting material disposed on a vented end of the battery cells in accordance with an exemplary embodiment is shown. As illustrated, the battery module 700 includes a cell holder 704 that is partially covered by a current collector plate 708. Both the cell holder 704 and the current collector plate 708 include openings that expose a vented end of each of the battery cells, which is covered by a second potting material 705. In exemplary embodiments, the second potting material 705 is disposed in each of the openings in a manner such that the second potting material 705 does not extend above an upper surface of the current collector plate 708.

In exemplary embodiments, the second potting material 705 is a thixotropic material that has a lower viscosity when being applied to the vented end of the battery cell and a higher viscosity after it has been applied to the vented end of the battery cell. In exemplary embodiments, the second potting material 705 is applied to the vented end of the battery cell such that the second potting material 705 does not obstruct a vent disposed on the vented end of the battery cell. In one embodiment, as best shown in FIG. 5, the second potting material 705 does not extend between the electrode of the cell and the vented end of the battery cell. In addition, the second potting material 705 does not extend between the cell holder 704 and the battery cell. The second potting material 705 is configured to adhere to the cell holder 704 in such a manner such that the second potting material 705 will separate from the cell holder 704 under a pressure created by the venting of gases from the battery cell.

Figure 7B:
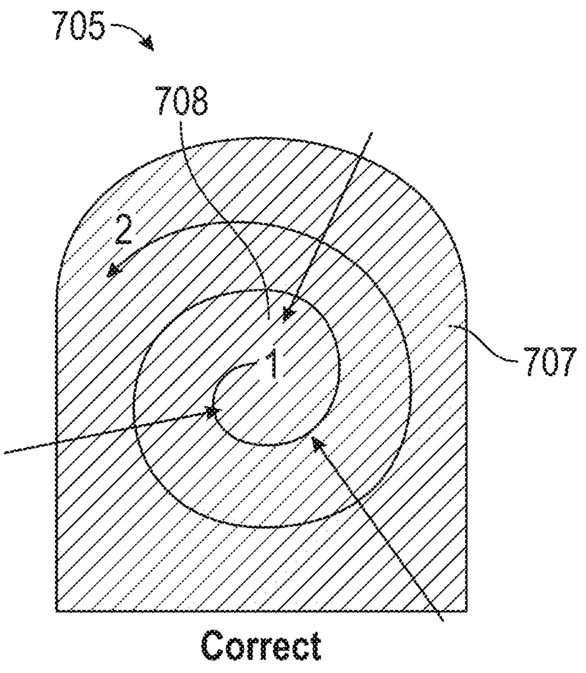
FIGS. 7B and 7C are schematic diagrams illustrating methods for the application of a potting material on a vented end of a battery cell in accordance with exemplary embodiments.
Figure 7C:
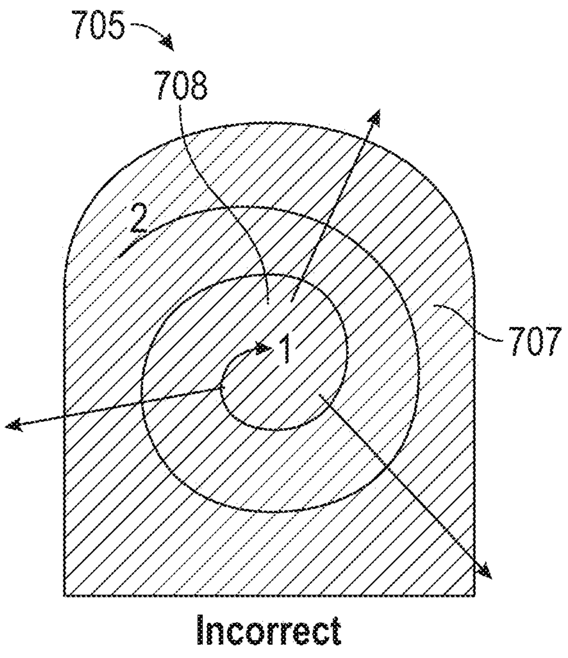

Referring now to FIGS. 7B and 7C, schematic diagrams illustrating methods for application of the second potting material 705 on a vented end of a battery cell in accordance with exemplary embodiments are shown. As shown in FIG. 7B, in one embodiment, the second potting material 705 is applied starting in a center portion (1) of an opening 707 along a circular path that radially extends from the center portion (1) to an edge (2) of the opening 707. In this embodiment, a pressure caused by the second potting material 705 as it is dispensed over the battery cell is directed towards the center portion of an opening 707, which prevents the second potting material 705 from flowing into a space below the fuse portion of the current collector plate 708 or between the cell holder 704 and the battery cell. In another embodiment, as shown in FIG. 7C, the second potting material 705 is applied starting at an edge portion (2) of the opening 707 along a circular path that radially converges from the edge portion (2) of the opening 707 to a center portion (1) of the opening 707.

Figure 8A:
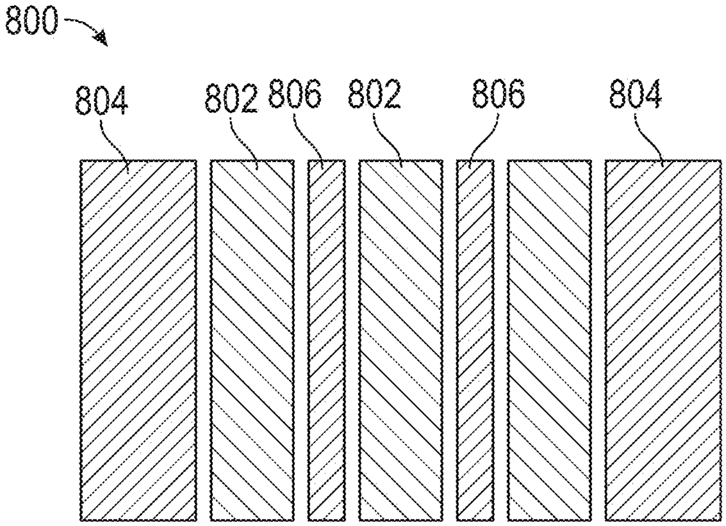
FIG. 8A is a cross-sectional view of a portion of the battery module in accordance with an exemplary embodiment.

Referring now to FIG. 8A, a cross-sectional view of a portion of battery module 800 in accordance with an exemplary embodiment is shown. As illustrated, the battery module 800 includes a plurality of battery cells 802 that are separated from one another by an interior portion of a thermally conductive frame 806. In addition, one or more of the battery modules 802 are disposed next to an exterior portion of a thermally conductive frame 804. In exemplary embodiments, the exterior portion of a thermally conductive frame 804 has a width that is greater than the interior portion of a thermally conductive frame 806. In one embodiment, the exterior portion of a thermally conductive frame 804 is four times as wide as the interior portion of a thermally conductive frame 806. In exemplary embodiments, the exterior portion of a thermally conductive frame 806 extends substantially along the length of the battery cells 802.

Figure 8B:
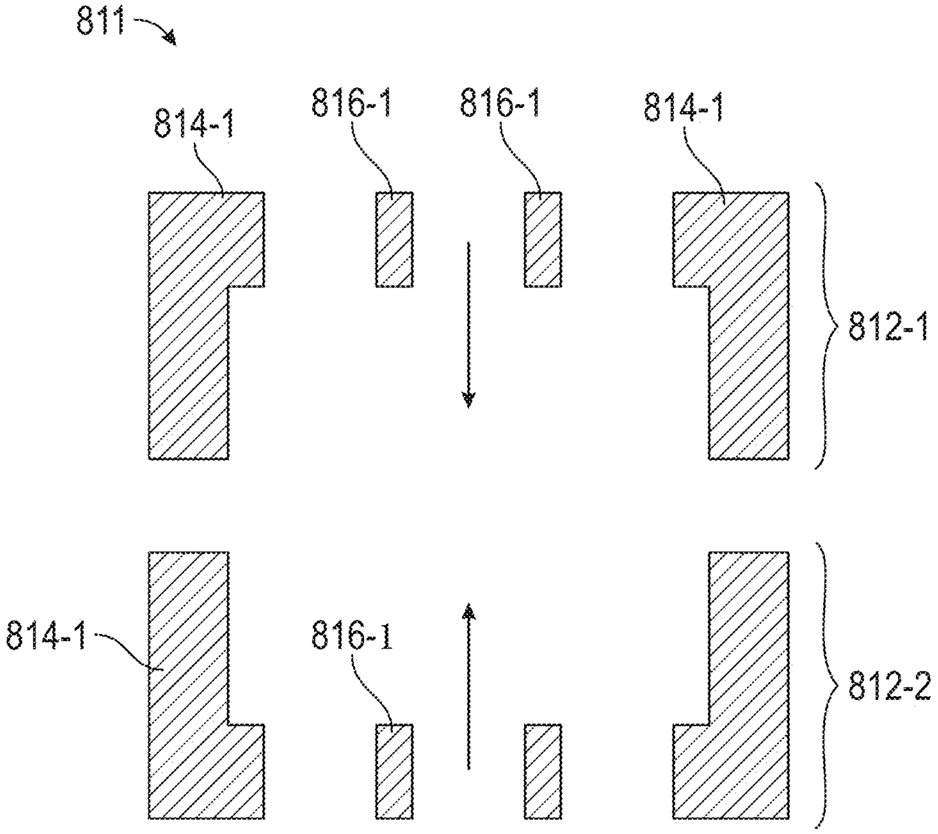
FIG. 8B is a disassembled cross-sectional view of a thermally conductive frame of a battery module in accordance with an exemplary embodiment.

Referring now to FIG. 8B, a disassembled cross-sectional view of a thermally conductive frame 811 of a battery module in accordance with an exemplary embodiment is shown. As illustrated, the thermally conductive frame 811 includes a first side 812-1 and a second side 812-2 that are separately formed. The first side 812-1 includes interior portions 816-1 and exterior portions 814-1. As illustrated, the interior portions 816-1 have a width that is smaller than the width of the exterior portions 814-1 and the exterior portions 814-1 have a length that is substantially greater than the length of the interior portions 816-1. In exemplary embodiments, after the first side 812-1 and a second side 812-2 are formed, they are joined together to form the thermally conductive frame 811.

Figure 8C:
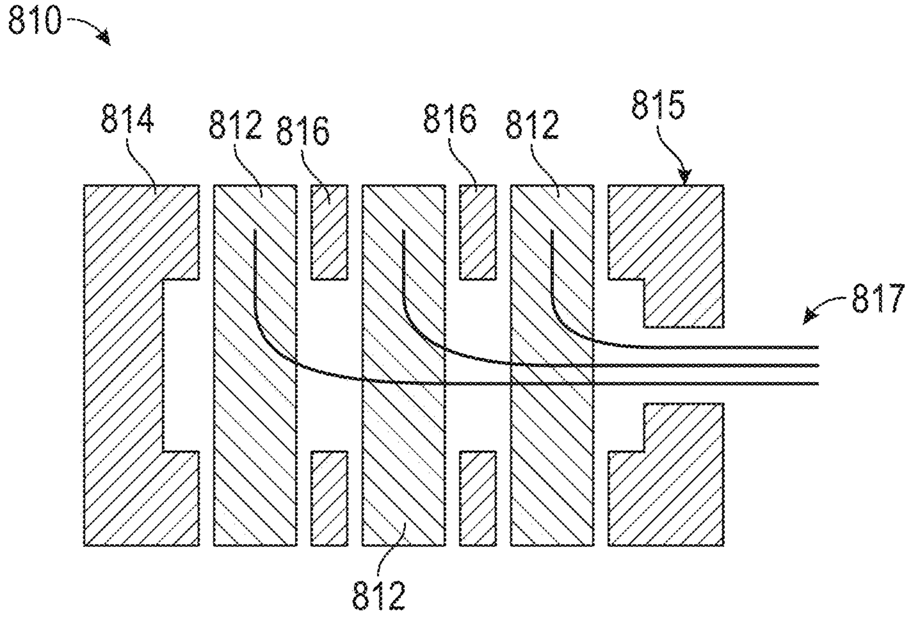
FIGS. 8C and 8D are a cross-sectional view of a portion of the battery module in accordance with exemplary embodiments.
Figure 8D:
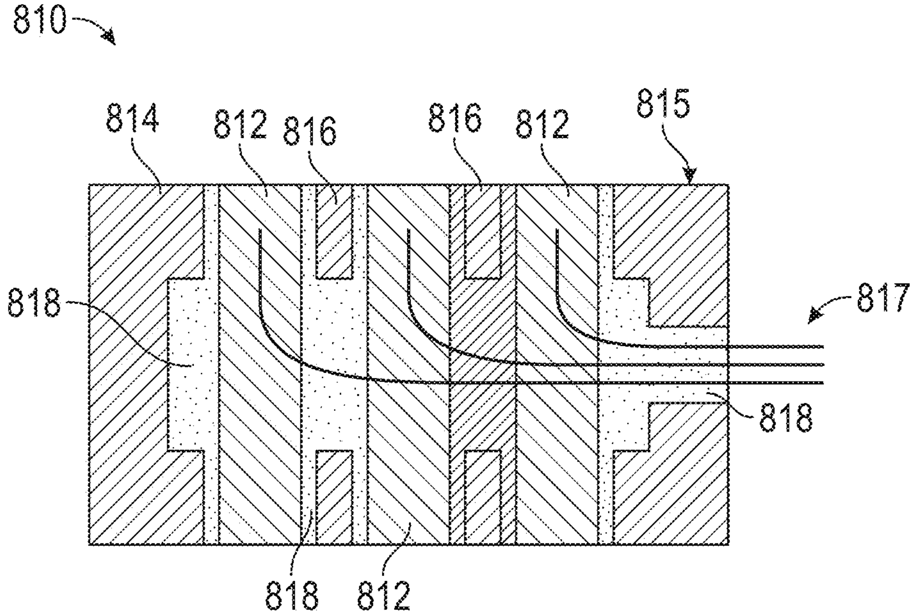

Referring now to FIGS. 8C and 8D, cross-sectional views of a portion of battery module 810 in accordance with exemplary embodiments are shown. As illustrated, the battery module 810 includes a plurality of battery cells 812 that are separated from one another by an interior portion 816 of a thermally conductive frame 815. In addition, one or more of the battery cells 812 are disposed next to an exterior portion 814 of a thermally conductive frame 815. In exemplary embodiments, the exterior portion 814 of a thermally conductive frame 815 has a width that is greater than the interior portion 816 of a thermally conductive frame 815. In one embodiment, the exterior portion 814 of a thermally conductive frame 815 is four times as wide as the interior portion 816 of a thermally conductive frame 815. In exemplary embodiments, the interior portion 816 of a thermally conductive frame 815 only extends along a portion of the length of the battery cells 812, while the exterior portion 814 of a thermally conductive frame 815 extends substantially along the length of the battery cells 802.

In exemplary embodiments, the battery module 810 also includes a plurality of wires 817 that are connected to sensors disposed on one or more of the battery cells 812. The sensors may be configured to monitor the temperature and/or the voltage level of the battery cells 812. The battery module 810 also includes a first potting material 818 that is disposed between the battery cell 802 and the thermally conductive frame 815. The first potting material 818 may encapsulate at least a portion of the plurality of wires 817. In exemplary embodiments, the first potting material 818 is configured to provide thermal insulation between the adjacent battery cells 812.

Figure 9:
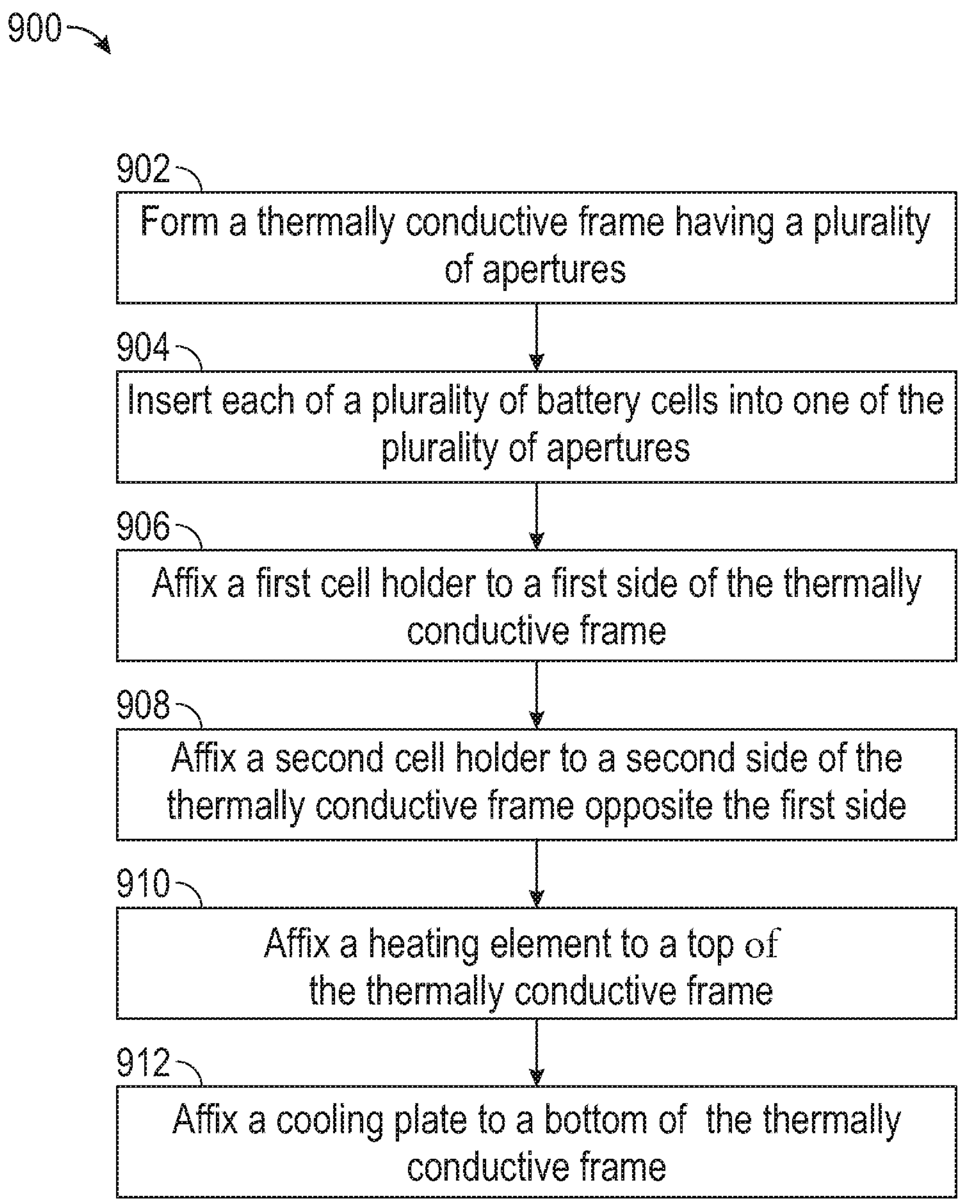
FIG. 9 is a flowchart diagram of a method for forming a battery module in accordance with an exemplary embodiment.

Referring now to FIG. 9 a flowchart diagram of a method 900 for forming a battery module in accordance with an exemplary embodiment is shown. At block 902, the method 900 includes forming a thermally conductive frame having a plurality of apertures. In exemplary embodiments, the thermally conductive frame has a thermal mass of at least 850 J/kgK and a thermal conductivity of at least 175 W/mK. In one embodiment, forming the thermally conductive frame comprises joining a first side frame and a second side frame to form the thermally conductive frame.

At block 904, the method 900 includes inserting each of a plurality of battery cells into one of the plurality of apertures. In exemplary embodiments, each of the plurality of battery cells includes a vented end and a non-vented end. Next, at block 906, the method 900 includes affixing a first cell holder to a first side of the thermally conductive frame. At block 908, the method 900 includes affixing a second cell holder to a second side of the thermally conductive frame opposite the first side. Next, at block 910, the method 900 includes affixing a heating element to a top of the thermally conductive frame. The method 900 concludes at block 912 with affixing a cooling plate to a bottom of the thermally conductive frame.

In exemplary embodiments, the thermally conductive frame includes a plurality of cooling ribbons that are disposed between at least two of the plurality of apertures. Each of the plurality of cooling ribbons extends from the top of the thermally conductive frame to the bottom of the thermally conductive frame. In one embodiment, each of the ribbons extends from the first side of the thermally conductive frame to the second side of the thermally conductive frame. In another embodiment, at least one of the ribbons extends from one of the first side of the thermally conductive frame and the second side of the thermally conductive frame less than half the width of the thermally conductive frame.

In exemplary embodiments, the plurality of apertures are divided into sub-groups that each consist of three of the plurality of apertures. The sub-groups are arranged in columns that extend from the top of the thermally conductive frame to the bottom of the thermally conductive frame. In one embodiment, each of the plurality of cooling ribbons is disposed between adjacent columns. In exemplary embodiments, a first column includes sub-groups arranged in a first pattern and a second column, adjacent to the first column, includes sub-groups arranged in a second pattern that is different than the first pattern.

In exemplary embodiments, each of the sub-groups is formed by forming the three of the plurality of apertures in a triangular arrangement and forming a central aperture in a center of the triangular arrangement. In one embodiment, the central aperture at least partially overlaps each of the three of the plurality of apertures.

Figure 10:
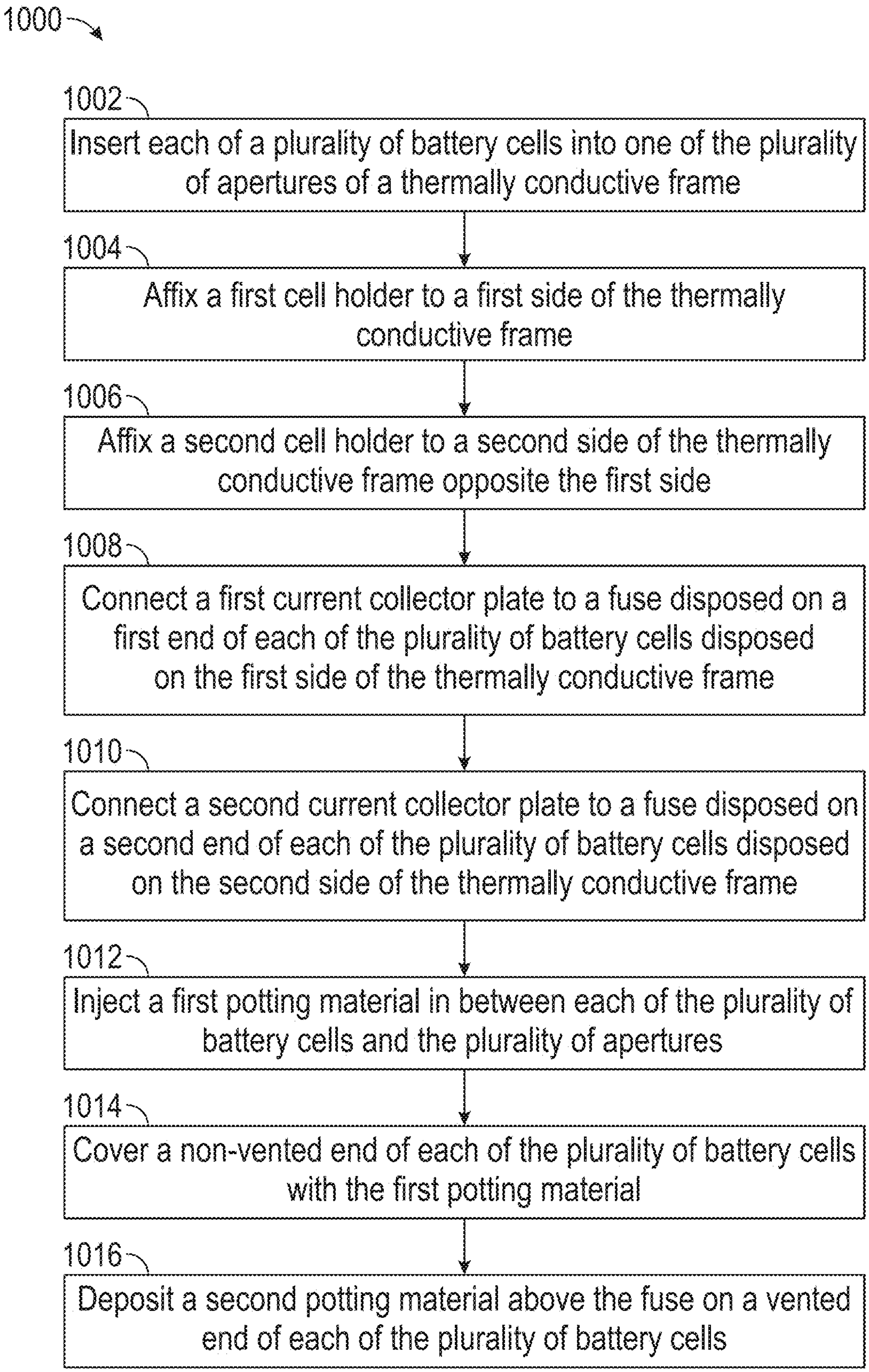
FIG. 10 is a flowchart diagram of a method for forming a battery module in accordance with an exemplary embodiment.

Referring now to FIG. 10 a flowchart diagram of a method 1000 for forming a battery module in accordance with an exemplary embodiment is shown. The method 1000 begins at block 1002 by inserting each of a plurality of battery cells into one of a plurality of apertures of a thermally conductive frame. In exemplary embodiments, the thermally conductive frame has a thermal mass of at least 850 J/kgK and a thermal conductivity of at least 175 W/mK. In one embodiment, forming the thermally conductive frame comprises joining a first side frame and a second side frame to form the thermally conductive frame.

At block 1004, the method 1000 also includes affixing a first cell holder to a first side of the thermally conductive frame. Next, at block 1006, the method 1000 includes affixing a second cell holder to a second side of the thermally conductive frame opposite the first side. Also, at block 1008, the method 1000 includes connecting a first current collector plate to a fuse disposed on the first end of each of the plurality of battery cells disposed on the first side of the thermally conductive frame. Next, at block 1010, the method 1000 includes connecting a second current collector plate to an electrode disposed on the second end of each of the plurality of battery cells disposed on the second side of the thermally conductive frame. At block 1012, the method 1000 includes injecting a first potting material in between each of the plurality of battery cells and the plurality of apertures. In exemplary embodiments, the first cell holder and the second cell holder each include one or more vents configured to allow air to escape during the injecting.

In exemplary embodiments, at block 1014, the method 1000 also includes covering a non-vented end of each of the plurality of battery cells with the first potting material. The method 1000 further includes depositing a second potting material above the fuse on a vented end of each of the plurality of battery cells, at block 1016. In exemplary embodiments, the second potting material does not extend above a body portion of the first current collector plate or the second current collector plate. In one embodiment, the second potting material is deposited in a spiral manner extending from the center of each of the plurality of battery cells to the edge of each of the plurality of battery cells.

In exemplary embodiments, the plurality of apertures comprises a first set of apertures that are disposed on an interior portion of the thermally conductive frame and a second set of apertures that are disposed on an exterior portion of the thermally conductive frame. The distance between adjacent apertures of the first set of apertures is less than the distance between the apertures of the second set of apertures and an edge of the thermally conductive frame. In one embodiment, the distance between the apertures of the second set of apertures and an edge of the thermally conductive frame is at least four times greater than the distance between adjacent apertures of the first set of apertures.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery pack comprising:

a plurality of battery modules, each of the plurality of battery modules comprising a thermally conductive frame having a plurality of apertures;

a plurality of battery cells, wherein each of the plurality of battery cells is disposed in one of the plurality of apertures; and a first potting material disposed in each of the plurality of apertures between each of the plurality of battery cells and the thermally conductive frame, wherein each of the plurality of battery cells comprises a vented end and a non-vented end, and wherein the non-vented end is covered by the first potting material, wherein the vented end of each of the plurality of battery cells includes a fuse that is in contact with a tab portion of a first current collector plate having a body portion and a tab portion and configured to electrically connect to an electrode disposed on the vented end and wherein a second potting material is disposed above the tab portion, the second potting material being disposed above an upper portion of the electrode and on top of the tab portion of the first current collector plate, encapsulating the fuse.

2. The battery pack of claim 1, wherein the second potting material does not extend above the body portion of the first current collector plate.

3. The battery pack of claim 1, wherein the thermally conductive frame has a thermal mass of at least 850 J/kgK and a thermal conductivity of at least 175 W/mK.

4. The battery pack of claim 1, wherein each of the plurality of battery modules comprises a first cell holder affixed to a first side of the thermally conductive frame and a second cell holder affixed to a second side of the thermally conductive frame opposite the first side.

5. The battery pack of claim 1, wherein the first potting material has a thermal conductivity that is lower than a thermal conductivity of the thermally conductive frame.

6. The battery pack of claim 1, wherein each of the plurality of battery modules comprises a heating element disposed on a top surface of each battery module and a cooling plate disposed on a bottom surface of each battery module.

7. The battery pack of claim 1, wherein the plurality of apertures of the thermally conductive frame are arranged in a honeycomb pattern.

8. The battery pack of claim 1, wherein the plurality of apertures are divided into sub-groups that each include three of the plurality of apertures and three of the plurality of battery cells.

9. The battery pack of claim 8, wherein the sub-groups are arranged in columns that extend from a top surface of each battery module to a bottom surface of each battery module.

10. The battery pack of claim 9, wherein each of the plurality of battery modules comprises a cooling ribbon disposed between each column of the sub-groups.

11. The battery pack of claim 10, wherein the cooling ribbon is a solid piece of thermally conductive material that extends from a top surface of each battery module to a bottom surface of each battery module.

12. The battery pack of claim 10, wherein the cooling ribbon is a continuous portion of the thermally conductive frame that extends from a heating element disposed on a top surface of each battery module to a cooling plate disposed on a bottom surface of each battery module.

13. The battery pack of claim 1, wherein each of the plurality of apertures is cylindrical in shape and has a diameter that is approximately one to two millimeters larger than a diameter of a corresponding one of the plurality of battery cells.

14. The battery pack of claim 13, wherein a circumferential space of approximately one-half to one millimeter is disposed between the corresponding one of the plurality of battery cells and a sidewall of the aperture in which the corresponding one of the plurality of battery cells is disposed.

15. The battery pack of claim 1, wherein the plurality of battery cells are grouped into sub-groups, and wherein each sub-group includes three battery cells arranged in a triangular configuration.

16. The battery pack of claim 1, wherein the thermally conductive frame further includes a central aperture disposed between three of the plurality of apertures.

17. The battery pack of claim 16, wherein the central aperture at least partially overlaps each of the three apertures.

18. The battery pack of claim 1, wherein the first potting material is one of an epoxy, polyurethane, silicone, polyamide, bismaleimide, benzoxizine, or polyester.

19. A battery pack comprising:

a plurality of battery modules, each of the plurality of battery modules comprising a thermally conductive frame having a plurality of apertures;

a plurality of battery cells, wherein each of the plurality of battery cells is disposed in one of the plurality of apertures; and a first potting material disposed in each of the plurality of apertures between each of the plurality of battery cells and the thermally conductive frame, wherein each of the plurality of battery cells comprises a vented end and a non-vented end, and wherein the non-vented end is covered by the first potting material, wherein the vented end of each of the plurality of battery cells includes a fuse that is in contact with a tab portion of a first current collector plate having a body portion and a tab portion and configured to electrically connect to an electrode disposed on the vented end and wherein a second potting material is disposed above the tab portion, the second potting material being disposed above an upper portion of the electrode and on top of the tab portion of the first current collector plate, encapsulating the fuse, wherein the thermally conductive frame is constructed of aluminum or an aluminum alloy.

20. A battery pack comprising:

a plurality of battery modules, each of the plurality of battery modules comprising a thermally conductive frame having a plurality of apertures;

a plurality of battery cells, wherein each of the plurality of battery cells is disposed in one of the plurality of apertures; and a first potting material disposed in each of the plurality of apertures between each of the plurality of battery cells and the thermally conductive frame; and a plurality of wires connected to sensors disposed on one or more of the plurality of battery cells, wherein the first potting material encapsulates at least a portion of the plurality of wires, wherein each of the plurality of battery cells comprises a vented end and a non-vented end, and wherein the non-vented end is covered by the first potting material, wherein the vented end of each of the plurality of battery cells includes a fuse that is in contact with a tab portion of a first current collector plate having a body portion and a tab portion and configured to electrically connect to an electrode disposed on the vented end and wherein a second potting material is disposed above the tab portion, the second potting material being disposed above an upper portion of the electrode and on top of the tab portion of the first current collector plate, encapsulating the fuse.

* * * * *